Oct. 15, 1968          L. F. MUELLER                3,406,353
          AUTOMATIC TUNING OF QUANTUM RESONANCE CIRCUITS
Filed May 17, 1965                              2 Sheets-Sheet 1
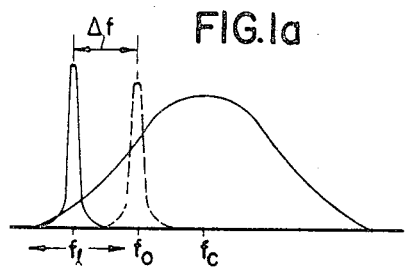
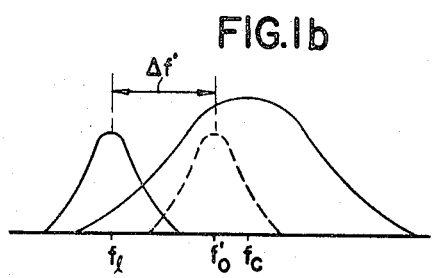
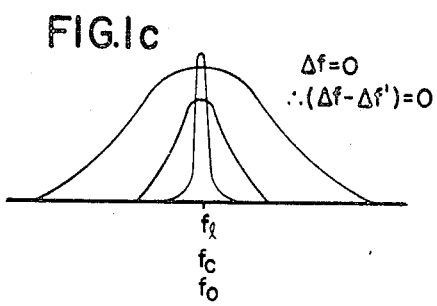
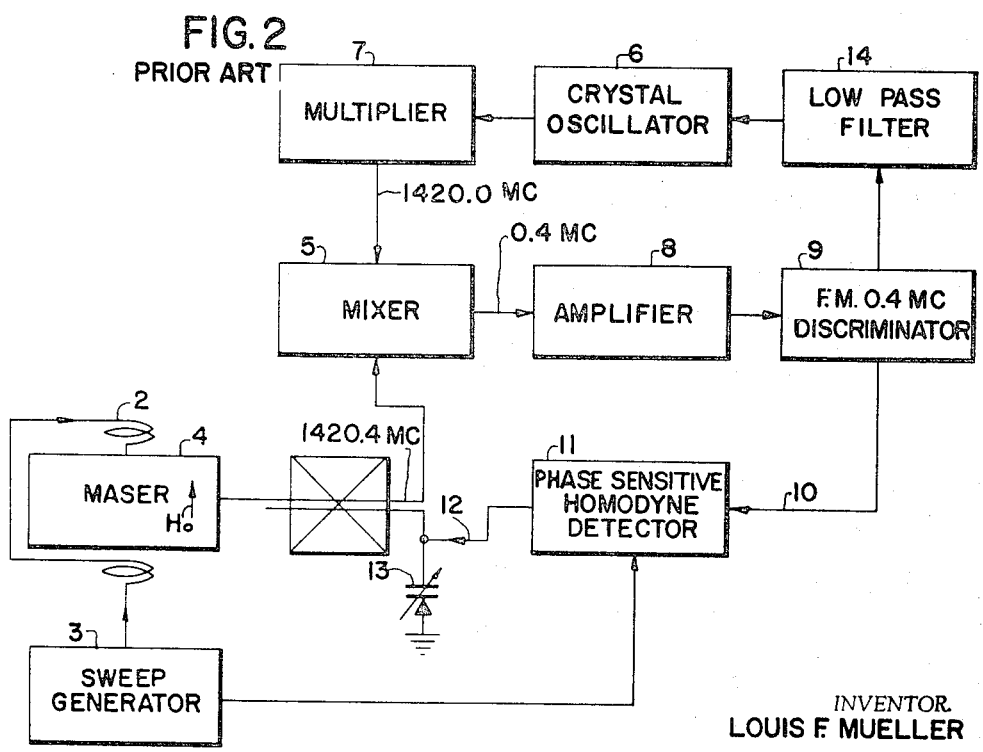
INVENTOR.
LOUIS F. MUELLER
BY *Harry E. Ovie*
ATTORNEY

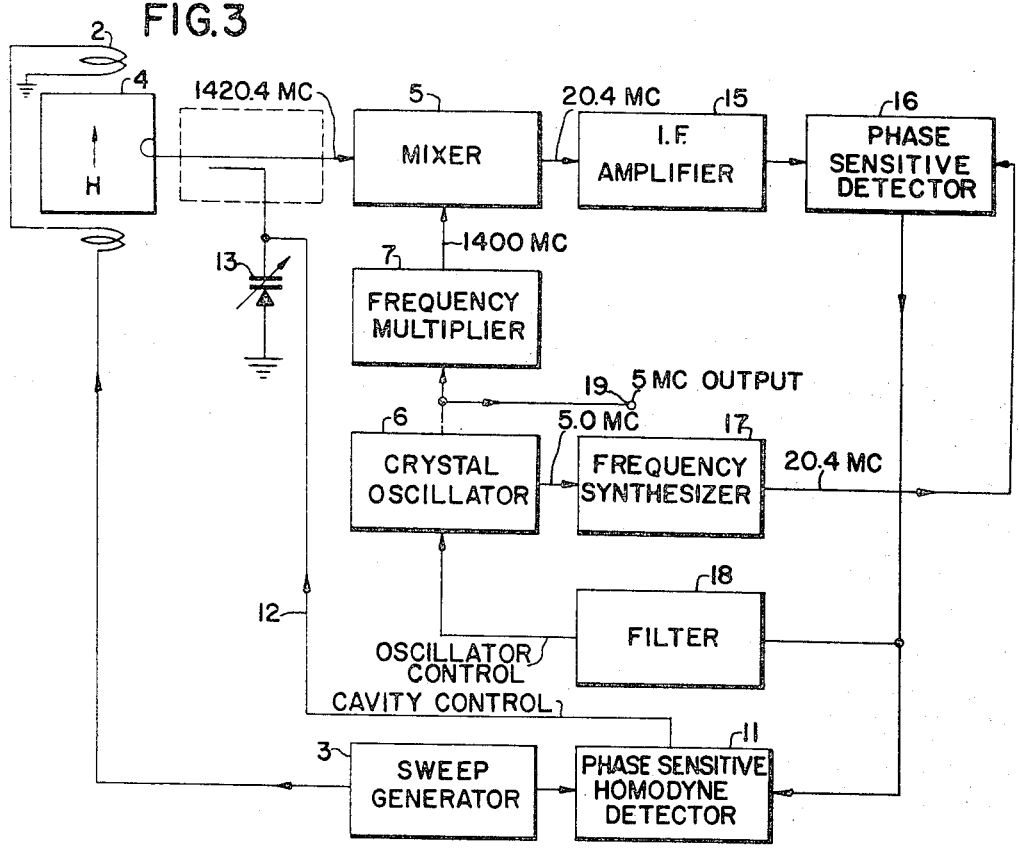
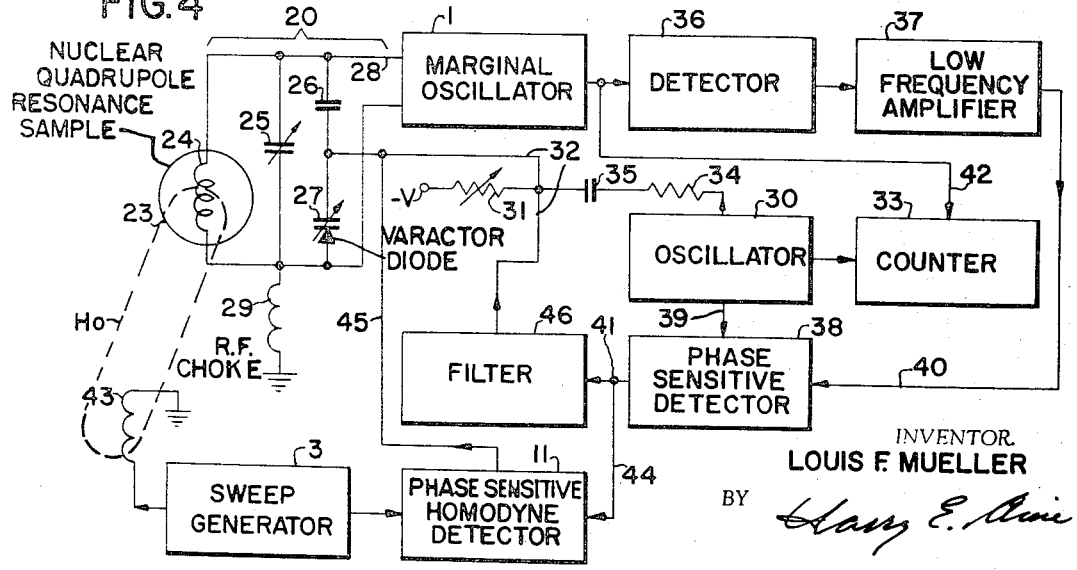

United States Patent Office 3,406,353
Patented Oct. 15, 1968

3,406,353
AUTOMATIC TUNING OF QUANTUM RESONANCE CIRCUITS
Louis F. Mueller, Jr., Marblehead, Mass., assignor to Varian Associates, Palo Alto, Calif., a corporation of California
Filed May 17, 1965, Ser. No. 456,245
6 Claims. (Cl. 331—3)

ABSTRACT OF THE DISCLOSURE

Atomic resonance systems are disclosed. The systems include an ensemble of atomic resonators, such as a sample of atomic resonance gas or nuclear quadrupole resonance material, coupled to a resonant circuit. Atomic resonance is induced in the sample material and resonance signals are extracted from the tuned resonant circuit. A modulator is provided for modulating the line width of the resonance line to produce a modulated resonator detuning component on the resonance signal due to the pulling of the resonant circuit on the frequency of the atomic resonance line. A first stage of phase sensitive detection is provided for detecting the resonance signal and for passing the frequency detuning component at the modulation frequency through to a second stage of phase sensitive detection wherein this detuning component is phase sensitive detected against the modulator frequency to produce a resonator tuning control signal which is fed back to tune the resonator to the precise center frequency of the atomic resonance line. In one embodiment of the present invention, the atomic resonance material is an atomic resonance gas such as hydrogen, rubidium, etc. The output of the first stage of phase sensitive detection is employed for phase locking a local oscillator crystal frequency to the phase of the natural frequency of the resonance line and an output of the local oscillator is employed as a frequency standard output. In a second embodiment of the present invention, the atomic resonance material comprises a nuclear quadrupole resonance sample and the output of the first stage of phase sensitive detection is employed for tuning the resonator circuit coupled to the quadrupole resonance sample. The output of the second stage of phase sensitive detection is employed for fine tuning the same resonant circuit coupled to the sample at a time constant substantially different than the time constant of the first resonator tuning control signal.

Heretofore it has been proposed to automatically tune the resonant frequency of a resonant circuit to the center of the natural resonant line of an ensemble of quantum resonant oscillators electromagnetically coupled thereto by means of a phase sensitive feedback circuit deriving its signal from a sideband component of the quantum resonance line obtained by periodically line broadening the quantum resonance line. Such a system is described and claimed in a copending application of Jacques Vanier, Ser. No. 456,246, filed May 17, 1965, now abandoned, and assigned to the same assignee as the present invention. Such a prior system has great utility when used on a hydrogen maser since it allows the hydrogen maser cavity to be tuned precisely to the exact center frequency of the natural atomic hydrogen resonance line to prevent any frequency shift due to cavity pulling, i.e., frequency pulling or shift of the resonance output frequency due to detuning of the maser cavity. In this manner, successive hydrogen maser frequency standards can be manufactured each giving the same output frequency; this property is referred to as reproducibility.

In the prior system one stage of phase sensitive detection was used in the tuning feedback control circuit. While one stage is sufficient to derive a control signal it has been found that two tandem stages of phase sensitive detection improved the quality of the tuning control. In addition, the use of dual stages of phase detection in the feedback circuit further has the advantage of permitting one of the outputs, as for example, from the first phase detector stage to be employed for phase locking a local oscillator circuit to the natural resonance line of the quantum oscillators. For example in the case of the hydrogen maser, the output of the first phase detection stage may advantageously be employed for phase locking a crystal oscillator, at any derived frequency, to the hydrogen resonance line of the maser whereby a convenient integer frequency output signal as of, for example, 5 or 1 mc. is obtained with the unprecedented long term phase stability of the hydrogen resonance line.

The principal object of the present invention is to provide an improved automatic tuning circuit for tuning a resonator to the center of the resonance line of an ensemble of quantum oscillators.

One feature of the present invention is the provision, in a quantum oscillator device, of dual tandem stages of phase detection producing dual phase lock feedback signals with different time constants or signal frequency bands whereby certain common circuit portions may be used for deriving the two quantum resonance phase lock signals.

Another feature of the present invention is the same as the preceding feature wherein one feedback signal tunes the resonant frequency of a resonant circuit electromagnetically coupled to the ensemble of quantum oscillating bodies.

Another feature of the present invention is the same as the preceding wherein the other feedback signal tunes the frequency of a crystal oscillator for locking the phase of the crystal oscillator to the phase of the resonance line of the quantum oscillating bodies.

These and other features and advantages of the present invention will become more apparent upon a perusal of the following specification taken in conjunction with the accompanying drawing wherein:

FIGS. 1(a–c) are plots of resonance amplitude vs. frequency showing the effects of cavity pulling on a resonance line, in the plots the frequency separations are exaggerated to better show the frequency pulling effects, FIG. 2 is a circuit diagram in block diagram form of the prior art circuit, FIG. 3 is a circuit diagram in block diagram form of a tuning circuit for a quantum oscillator employing features of the present invention, and FIG. 4 is a circuit diagram in block diagram form of an alternative quantum oscillator employing features of the present invention.

Referring now to FIGS. 1(a–c) the cavity pulling effect will be described. In general, two oscillators electrically coupled together will exhibit the pulling effect inasmuch as the two oscillators will tend to pull toward a common resonance frequency. The resonator with the greatest stored energy will tend to pull harder and thus if the two resonators have widely different stored energies the pulling effect amounts to a pulling of the resonator with the smallest stored energy toward the frequency of the resonator with the largest stored energy.

Now for the case when an ensemble of atomic or quantum resonators, such as gaseous atoms, are resonating within a tuned circuit, such as a cavity resonator, electromagnetically coupled thereto, the cavity generally has much greater control and therefore the cavity tends to pull the resonant frequency of the atoms toward its resonant frequency.

FIG. 1(a) shows the frequency shift $\Delta f$ in the resonant line 1 of the atoms as it is pulled toward the cavity resonant frequency of the cavity $f_c$. This occurs even though the Q of the cavity is much less than the Q of the ensemble of atomic or other quantum oscillators. It turns out that the frequency pulling also depends upon the Q of the quantum oscillator resonance line, the frequency deviation, or pulling $\Delta f$, being inversely proportional to the Q of the resonant line of the quantum oscillators. This is shown in FIG. 1(b).

Of course when the resonant frequency of the quantum oscillators $f_1$, coincides with the resonant frequency of the cavity or circuit $f_c$, the frequency deviation $\Delta f$ is zero, regardless of the line Q. This is shown in FIG. 1(c). Thus a modulation of the line Q, when the resonant circuit or cavity frequency $f_c$ is displaced, yields a frequency modulation sideband signal. This F.M. signal component is utilized in the aforementioned copending application to produce a phase lock feedback signal for tuning the cavity or resonant circuit frequency $f_c$ to the resonant frequency of the quantum oscillators $f_1$ to eliminate unwanted cavity pulling effects.

Now in FIG. 2 there is shown the prior circuit for tuning the resonant frequency $f_c$ of the resonant circuit to the resonant frequency $f_1$ of the quantum oscillators (ensemble of hydrogen atoms), contained within the resonant circuit. More particularly, the Q of the resonant line of the quantum oscillators is periodically broadened by applying a cyclically variable magnetic gradient, produced by bucking connected coils 2 across the ensemble of resonating hydrogen atoms of a conventional hydrogen maser as described in copending U.S. application Ser. No. 142,356, filed Oct. 2, 1961, now issued as U.S. 3,255,423 on June 7, 1966 and assigned to the same assignee as the present invention. The current to the gradient coils 2 is supplied from a sweep generator 3 operating at a suitably low frequency as of, for example, 1 c.p.s. This causes a frequency modulation on the maser output signal with a frequency deviation of $(\Delta f - \Delta f')$ and at a modulating frequency of the sweep generator 3. The output frequency of the maser at 1420.4 . . . etc. mc. is mixed in mixer 5 with a signal at 1420.0 . . . etc. mc. obtained from a crystal oscillator 6 and multiplier 7, more fully described below, to produce a low frequency I.F. signal at 0.4 etc. mc. The I.F. signal is then amplified in I.F. amplifier 8 and fed to the input terminal of an F.M. discriminator 9, such as for example, a Foster Seeley discriminator using a 0.4 etc. mc. crystal. The discriminator 9 converts the 1 c.p.s. F.M. sideband component of the maser output signal to a 1 c.p.s. A.M. output signal which is fed via lead 10 to one input terminal of a phase sensitive homodyne detector 11. A sample of the A.M. sweep signal obtained from the sweep generator 3 is fed to the other input terminal of the homodyne detector 11.

The output of the homodyne detector includes a D.C. error component, i.e., band pass less than 0.1 c.p.s., with a phase and magnitude dependent upon the phase and magnitude of the maser cavity detuning from the natural resonance frequency of the hydrogen atoms. This error component is then fed via lead 12 to a cavity tuning device 13, more fully described below, for tuning the maser cavity to the resonant frequency of the hydrogen atoms and thus eliminating undesired cavity pulling effects. Slight drift or frequency shift of the local oscillator 6 is corrected by feeding back a portion of the F.M. discriminator output signal via a low pass filter 14 having an upper cut off of about 0.01 c.p.s. to the crystal oscillator tuning input terminal.

Referring now to FIG. 3 there is shown a quantum oscillator incorporating the novel improvements of the present invention. Briefly, in this improved circuit, the local crystal oscillator 6 is phase locked to the (automatically tuned) natural quantum resonance line of the hydrogen maser 4, whereby an output signal, at any arbitrarily convenient frequency, is derived from the crystal. Such a crystal derived output signal has the unprecedented long term phase and frequency stability of the automatically tuned hydrogen maser 4.

More specifically, the crystal oscillator 6 is chosen at a desired frequency as, for example, 5 mc. and then multiplied by the frequency multiplier 7, as above, to a preselected local oscillator frequency as of 1400.00 . . . etc. mc. for mixing in mixer 5 with the natural resonance frequency $f_1$ of the quantum oscillators, i.e., hydrogen, atoms, at 1420.4 . . . etc. mc. and at, for example, 5μ volts to obtain a convenient predetermined intermediate frequency, I.F., as of 20.4000 . . . etc. mc. at 5 volts. The I.F. signal is amplified in I.F. amplifier 15 to a suitable amplitude as of 1 volt and fed to one input terminal of a phase sensitive detector 16 wherein the I.F. signal is compared with a signal at precisely the same I.F. frequency of 20.4000 . . . etc. mc. and 3–5 volts amplitude derived from the crystal oscillator 6 via the intermediary of a suitable frequency synthesizer 17. The output of the phase sensitive detector 16 contains signal information of two kinds, first, it includes an F.M. detected A.M. component of the quantum oscillators resonance line at the frequency of the sweep generator, i.e., 1 c.p.s. This component is used for tuning the maser cavity resonator frequency to the natural resonance frequency of the quantum oscillators, $f_1$, in the manner previously described with regard to FIG. 2.

Secondly, the output signal of the phase sensitive detector 16 includes an F.M. detected A.M. component which has a phase and amplitude proportional to the long term, i.e., >10 sweep cycles or >10 seconds, frequency or phase deviation of the crystal and maser derived predetermined I.F. frequency of 20.4 . . . etc. mc. from the synthesized I.F. frequency of 20.4 . . . etc. mc. obtained from the synthesizer 17. Since the long term maser frequency or phase is more stable than the crystal oscillator signal this second signal output component of the phase sensitive detector 16 represents the departure of the phase of the crystal oscillator from the fixed phase relationship of the natural resonance frequency of the atomic hydrogen quantum oscillators. This second signal component with a frequency below 0.01 c.p.s. is passed by a low pass filter 18 having a high frequency cut off of 0.01 c.p.s. to the tuning terminal of the crystal oscillator 6 for tuning the crystal oscillator 6 into a locked phase relationship with the phase of the natural resonant frequency of the resonant quantum oscillators. An output signal is extracted from the crystal oscillator 6 at 19. This output signal has the desirable property of being at any preselected desired low integral frequency such as 1, 2 . . . n mc. with the unprecedented phase stability of the automatically tuned hydrogen maser.

In the circuit of FIGS. 2 and 3 a suitable crystal oscillator 6 is a Sulzer Lab. model 5A crystal oscillator with a varicap frequency control. The crystal oscillator includes a suitable oven for maintaining frequency stability in a changing ambient temperature environment.

A suitable frequency synthesizer 17 includes, for example, a Hewlett Packard model 5100 A plus a model 5110 A synthesizer. A suitable phase sensitive homodyne detector 11 is, for example, an Electronics Missiles and Communications Inc., model RJB lock-in amplifier operated in the phase sensitive mode and having an integrated output low pass transmission characteristic with a high frequency cut off of about 0.1 c.p.s. A suitable voltage variable reactive device 13 for tuning the master cavity includes, for example, a Microlab coaxial 10 db directional coupler with a 1N23 diode connected in series with the center conductor of a shorted length of the directionally coupled coaxial line segment for variably changing the electrical length of the directionally coupled coaxial line segment by varying the conductance of the diode. By varying the electrical length of the coaxial line segment a variable reactance is reflected into the cavity of the maser via the intermediary of the directional coupler. This variable retcance reflected into the cavity is down by 10 db from the main output line and tunes the maser cavity. The conductance of the diode is variably controlled by a variable bias voltage applied thereacross which is derived from the output of the homodyne detector 11 via lead 12.

The maser oscillator circuit of FIG. 3 with the combined phase locked crystal output at 19 and the automatic cavity tuning feedback loop has the advantage of permitting certain elements of the combined circuit to perform dual functions. For example, the crystal oscillator 6 serves the dual function of local oscillator and phase locked oscillator to provide a convenient frequency phase locked output signal i.e., at 5 mc. In addition, the mixer 5 is common to both circuits as well as the first stage of phase sensitive detecting in phase sensitive detector 16. This common first stage of phase sensitive detecting, in detector 16, permits elimination of unwanted noise bandwidth from the cavity tuning control circuit. Thus, the second stage of phase sensitive detecting, in detector 11, can operate upon a relatively narrow band signal having a minimum of unwanted noise impressed thereon. It is easier and simpler to eliminate undesired noise bandwidth in the output of a phase sensitive detector than in the output of a frequency discriminator 9 as exemplified by the prior art.

Referring now to FIG. 4 there is shown a nuclear quadrupole resonance thermometer circuit incorporating the tandem dual phase detecting circuit feature of the present invention for tuning a resonant circuit to the center of the natural resonance line of quantum oscillators to which the resonant circuit is coupled to prevent circuit pulling of the natural resonance frequency or line $f_1$. In this manner more accurate measurements of temperature may be obtained and manufacturing reproducibility enhanced.

Briefly, the circuit of FIG. 4 comprises a conventional marginal oscillator 1 having a tank circuit 20 with a temperature sensing quadrupole resonance sample 23 such as potassium chlorate magnetically closely coupled to the R.F. magnetic fields of a coil 24 of the tank circuit 20. The coil 24 is parallel resonated with a capacitive network including a tunable capacitor 25 and a parallel branch containing a series connection of a fixed capacitance 26 and a voltage variable capacitor 27 such as varactor diode. The tank circuit 20 is tuned to the quadrupole resonance frequency of the sample such as 28.5 mc. and is connected to the input of the marginal oscillator 1 via lead 28 and to ground via R.F. choke 29.

A fixed D.C. bias voltage as of minus 9 volts is applied across the varactor diode 27 to ground from a source V via resistor 31 and lead 32. A varactor modulating voltage, at a suitable low frequency such as 1 kc., is applied across the varactor diode 27 from the gating circuit of a conventional frequency counter 33 such as model 52436 manufactured by Hewlett Packard, via resistor 34, coupling capacitor 35 and lead 32 for modulating the resonant frequency of the marginal oscillator 1 via frequency modulation of the tuned tank circuit 20. The gating circuit is nothing more than an oscillator which is shown for illustration as a separate device 30.

At nuclear quadrupole resonance of the $Cl^{35}$ isotope of Cl within the sample the amplitude of the marginal oscillator signal is modulated at the 1 kc. frequency of the frequency modulation of the tank 20 applied via varactor 27.

The amplitude modulation is extracted from the carrier of the marginal oscillator in detector 36 and applied to an audio or low frequency amplifier 37 wherein the signal is amplified and thence fed to one input terminal of a phase sensitive detector 38 via lead 40. Also, a sample of the modulation frequency is derived from the gating circuit of the counter 33 and fed to the other input terminal of the phase sensitive detector 38 via lead 39 where it is compared with the fundamental component of the amplitude modulation derived from amplifier 37. The output of the phase sensitive detector is a variable D.C. component of a proper phase and magnitude to feedback to the varactor diode 27 via lead 32 to center the resonant frequency of the tank circuit 20 at the center frequency of the quadrupole resonance line of the sensing sample 23. In this manner the frequency of the oscillations of the marginal oscillator 1 are locked or are tracked to the center of the N.Q.R. line which fluctuates in frequency in a predetermined manner with temperature.

A secondary fine tuning circuit for tuning the resonant circuit 20 more precisely to the exact center of the quadrupole resonant line or frequency $f_1$ includes a phase sensitive homodyne detector 11 and a sweep generator 3. The sweep generator 3 modulates the width of the nuclear quadrupole resonance line by means of applying to the quadrupole sample 23 a variable magnetic field $H_0$ produced by coil 43 at a relatively low frequency such as of 1 c.p.s. For a given sample, the error signal at lead 41, used to lock the marginal oscillator frequency to the quadrupole resonance line, is a function of the width of the quadrupole line. Consequently the error signal reflects the modulation of the quadrupole line or is modulated at the frequency of the sweep generator 3. This modulation is applied through lead 44 to the phase sensitive detector 11. A signal at the sweep frequency of 1 c.p.s. is derived from the sweep generator 3 and is fed to the other input terminal of the phase sensitive detector 11. The output of the phase detector 11 is zero when the marginal oscillator frequency is the same as the center frequency of the quadrupole line. When the marginal oscillator frequency is not at the center of the resonance line a modulation at lead 41 exists. The phase of this modulation relative to the reference signal of the generator 3 is given by the sign of the frequency difference between the marginal oscillator and the quadrupole resonance line. The output of the homodyne detector 11 is integrated to have a high frequency cut off of on the order of 0.1 c.p.s. and is fed to the resonant circuit frequency tuning element or varactor diode 27 via leads 45 and 32 to more precisely tune the resonant frequency of the circuit 20 to the center of the natural resonant line of the quadrupole sample 23.

A filter 46 having a low pass transmission characteristic with a high frequency cut off of 0.01 c.p.s. is placed in series with lead 41 for blocking the A.M. fine tuning signal at 1 c.p.s. from the first tuning control output signal in the output of the first phase sensitive detector 38. In this manner the desired A.M. 1 c.p.s. fine tuning signal is not automatically cancelled by the first automatic tuning control signal derived from the output of the first phase sensitive detector 38.

The R.F. oscillations of the marginal oscillator 1 are then tapped off and fed to the input terminal of the counter 33 via lead 42 where they are counted to give a measure of the temperature sensed by the N.Q.R. of the sample 23. Note that the counter 33 is measuring the frequency of the marginal oscillator 1 as it is locked to the center frequency of the N.Q.R. of the sample 23. Note also that the marginal oscillator 1 is being frequency modulated via the 1 kc. signal applied to the tank circuit 20 via varactor 27. A special feature of this circuit which permits very accurate measurement of the carrier frequency of the marginal oscillator, in spite of the frequency modulation impressed thereon, is the use of the counter gating signal, in this case at 1 kc., for performing the frequency modulation of the marginal oscillator 1. In this manner the frequency modulation cycle is correlated with the counting cycle or period of the counter 33 such that the period of the count is dimensioned to include an integral number of frequency modulation cycles such that the average frequency deviation during the count period is zero and thus no error is introduced by the frequency modulation.

The frequency counter 33 can be calibrated directly in units of temperature or frequency. It is easier from the equipment design standpoint to read out in units of frequency and convert to temperature directly by means of a graph of frequency versus temperature. With the circuit of FIG. 4 an almost instantaneous and continuous measurement of temperature to an accuracy of approximately ±0.001° K. is obtained over an extremely wide range of temperature from 10° K. to 641° K. using the $Cl^{35}$ isotope of the $KClO_3$ sample 23. Other suitable N.Q.R. samples include $NaClO_3$. Also, in a preferred embodiment the sample 23 is preferably shielded from stray extraneous magnetic fields by means of inserting the sample 23 within a high magnetically permeable container such as $M\mu$ Metal or Moly-Permalloy.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a quantum resonance apparatus, means forming an ensemble of quantum resonant bodies having a certain natural resonance spectral line frequency, means forming a resonator circuit coupled to said ensemble of quantum resonators and tuned to their resonant frequency, modulator means for time varying the resonance conditions of said resonance spectral line of said quantum resonators to produce a time varying modulation component on said resonance spectral line due to resonator circuit detuning, first phase sensitive detecting means, means forming a local oscillator, means for beating a signal derived from said local oscillator with a signal derived from said resonant spectral line to produce an intermediate frequency signal serving as one input to said first phase sensitive detector means, means for deriving from said local oscillator a second signal at said intermediate frequency and for applying said second signal to another input of said first phase sensitive detecting means to produce a time varying phase sensitive output signal having an amplitude and phase related to a departure of the phase relation of the local oscillator signal to the phase of the natural resonance line, means for tuning said local oscillator, means for applying a portion of said phase sensitive output signal to said tuning means for said local oscillator for tuning thereof and for locking the phase relation of said local oscillator to the phase of the natural resonance line of said quantum resonant bodies, means forming a second phase sensitive detecting stage, means for feeding the output of said first phase sensitive detecting means to one input of said second phase sensitive detecting means, means for feeding a signal derived from said modulator means to a second input of said second phase sensitive detection means for comparing the resonant circuit detuning component in the output of said first phase sensitive detecting means with the signal derived from said modulator means to produce a resonator circuit tuning control signal, and tuning means responsive to said tuning control signal for tuning said resonator circuit to the natural resonance frequency of said spectral line, whereby resonator detuning effects are minimized.

2. The apparatus according to claim 1 wherein said modulator means periodically varies the spectral line width of said quantum resonators to produce said modulation component of said resonance spectral line.

3. The apparatus according to claim 1 wherein said modulator means produces a time varying magnetic field component over said quantum resonators to produce said time varying resonance spectral line width.

4. The apparatus according to claim 1 wherein said quantum resonators are atomic particles in a gaseous state, and said resonator circuit is a cavity resonator surrounding said resonant atomic particles.

5. A quantum resonance apparatus including, means forming an ensemble of quantum resonant bodies having a certain natural resonance spectral line frequency, means forming a resonator circuit coupled to said ensemble of quantum resonators and tuned to their resonant frequency, resonator tuning means for tuning said resonant circuit, first modulator means for time varying the resonant frequency of said resonator circuit to produce a first time varying modulation component on said resonant spectral line, second modulator means for time varying the resonance conditions of said resonance spectral line of said quantum resonators to produce a second time varying modulation component on said resonance spectral line at a frequency substantially different than the first modulation frequency, first phase sensitive detecting means, means for deriving a sample signal from said first modulator means and applying same to one input of said first phase sensitive detecting means, means for applying the first time varying modulation frequency component on said resonance spectral line to the other input of said first phase sensitive detection means to produce a first phase sensitive output signal having an amplitude and phase related to the departure of the resonant frequency of the resonator circuit from the natural resonance frequency of the quantum resonant bodies, means for applying a portion of the output of said first phase sensitive detecting means to said resonator tuning means for tuning said resonator circuit to the natural resonance frequency of said spectral line, means forming a second phase sensitive detection stage, means for feeding a portion of the output signal of said first phase sensitive detection means to one input of said second phase sensitive detection means, means for feeding a signal derived from said second modulator means to a second input of said second phase sensitive detection means to produce a second resonator circuit tuning control signal, and means for feeding said second tuning control signal to said tuning means for tuning said resonator to the natural resonant frequency of said spectral line.

6. The apparatus according to claim 5 wherein said quantum resonant bodies are atomic nuclei in a state of quadrupole resonance.

References Cited

UNITED STATES PATENTS 2,926,310   2/1960   Winkler _____ 331—3 X

ROY LAKE, *Primary Examiner.*

S. H. GRIMM, *Assistant Examiner.*